(12) United States Patent  
Li et al.

(10) Patent No.: US 11,507,647 B2  
(45) Date of Patent: Nov. 22, 2022

(54) FINGERPRINT-BASED LOGIN SYSTEM, MICROCONTROLLER UNIT, FINGERPRINT-BASED POWER ASSEMBLY, AND ELECTRONIC TERMINAL

(71) Applicant: SHENZHEN GOODIX TECHNOLOGY CO., LTD., Shenzhen (CN)

(72) Inventors: Ruifeng Li, Shenzhen (CN); Bing Wang, Shenzhen (CN); Wenbin Sun, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 302 days.

(21) Appl. No.: 16/411,130

(22) Filed: May 13, 2019

(65) Prior Publication Data

US 2019/0266315 A1    Aug. 29, 2019

Related U.S. Application Data

(63) Continuation of application No. PCT/CN2018/074921, filed on Feb. 1, 2018.

(51) Int. Cl.
*G06F 21/32* (2013.01)
*G06F 9/4401* (2018.01)
(Continued)

(52) U.S. Cl.
CPC ............ *G06F 21/32* (2013.01); *G06F 9/4418* (2013.01); *G06V 40/13* (2022.01); *G06V 40/1365* (2022.01)

(58) Field of Classification Search
CPC ... G06F 21/32; G06F 9/4418; G06K 9/00013; G06K 9/00087
See application file for complete search history.

(56) References Cited

U.S. PATENT DOCUMENTS 9,230,150 B1 * 1/2016 Merrell .............. G06V 40/1347
10,339,362 B2 * 7/2019 Othman .............. G06V 40/1371
(Continued)

FOREIGN PATENT DOCUMENTS

AU    2017101425 A4    11/2017
CN    104573575 A    4/2015
(Continued)

*Primary Examiner* — Trang T Doan
(74) *Attorney, Agent, or Firm* — Emerson, Thomson & Bennett, LLC; Roger D. Emerson; Warren A. Rosborough (57) ABSTRACT

The fingerprint-based login method includes: waking up an operating system of a terminal device where a fingerprint sensor is disposed based on a detected non-press-type touch operation against the fingerprint sensor; controlling the fingerprint sensor to acquire fingerprint data based on a fingerprint data acquisition instruction sent by the waken-up operating system; storing the acquired fingerprint data to a designated security region in the terminal device by the waken-up operating system; and judging whether the fingerprint data stored in the designated security region matches fingerprint password data by the waken-up operating system upon detecting a press-type touch operation against the fingerprint sensor, such that a login operation is performed in the operating system if the stored fingerprint data matches the fingerprint password data, the problem that the fingerprint modules using the conventional MCUs failing to satisfy the requirements may not implement the system login function is effectively solved.

18 Claims, 5 Drawing Sheets

(51) Int. Cl.
  *G06V 40/13*    (2022.01)
  *G06V 40/12*    (2022.01)

(56) References Cited

U.S. PATENT DOCUMENTS

| | | | |
|---|---|---|---|
| 10,387,704 B2* | 8/2019 | Dagan | G06F 3/0412 |
| 10,402,621 B2* | 9/2019 | Merrell | H04L 63/0861 |
| 2007/0220273 A1* | 9/2007 | Campisi | G06Q 20/3574 |
| | | | 713/186 |
| 2009/0153293 A1 | 6/2009 | Chou | |
| 2013/0263252 A1* | 10/2013 | Lien | G06F 1/3215 |
| | | | 726/19 |
| 2014/0198960 A1* | 7/2014 | Thompson | G06V 40/13 |
| | | | 382/124 |
| 2014/0359758 A1 | 12/2014 | Lee et al. | |
| 2015/0254446 A1 | 9/2015 | LaCous et al. | |
| 2016/0085951 A1* | 3/2016 | Hamlin | G06F 21/32 |
| | | | 726/19 |
| 2016/0180142 A1* | 6/2016 | Riddle | G06V 40/107 |
| | | | 382/124 |
| 2017/0090593 A1* | 3/2017 | Cao | H01H 13/14 |
| 2017/0116455 A1* | 4/2017 | Alameh | G06V 40/13 |
| 2017/0220842 A1* | 8/2017 | Thompson | G06F 1/169 |
| 2017/0372123 A1* | 12/2017 | Kim | G06F 3/0412 |
| 2018/0032791 A1* | 2/2018 | Zhou | G06V 40/1371 |
| 2018/0101711 A1* | 4/2018 | D'Souza | G06F 21/32 |
| 2019/0065808 A1* | 2/2019 | Zhang | G06F 3/0481 |
| 2019/0130153 A1* | 5/2019 | Hu | G06K 9/62 |
| 2019/0156607 A1* | 5/2019 | Tao | G07C 9/00563 |
| 2019/0318072 A1* | 10/2019 | Yin | H04L 63/083 |
| 2020/0089859 A1* | 3/2020 | Guan | G06V 40/13 |
| 2020/0372239 A1* | 11/2020 | Schmitt | G06F 13/4282 |

FOREIGN PATENT DOCUMENTS

| | | |
|---|---|---|
| CN | 105743648 A | 7/2016 |
| CN | 106874728 A | 6/2017 |
| CN | 107153781 A | 9/2017 |
| CN | 107454955 A | 12/2017 |

\* cited by examiner

FIG. 7

FINGERPRINT-BASED LOGIN SYSTEM, MICROCONTROLLER UNIT, FINGERPRINT-BASED POWER ASSEMBLY, AND ELECTRONIC TERMINAL

CROSS-REFERENCE TO RELATED APPLICATIONS

The present application is a continuation of international application No. PCT/CN2018/074921, filed on Feb. 1, 2018, which is hereby incorporated by reference in its entireties.

TECHNICAL FIELD

Embodiments of the present disclosure relate to the field of touch techniques, and in particular, relate to a fingerprint-based login method, a microcontroller unit, a fingerprint-based power assembly and an electronic terminal.

BACKGROUND

With the development of fingerprint identification technologies and terminal technologies, more and more terminal devices perform corresponding operations by means of fingerprint identification, for example, logging in to the operating system based on fingerprint identification. For example, system login is implemented by a touch operation against a fingerprint sensor in a fingerprint module, or one-button login is implemented for the terminal device by a touch operation against a power button where the fingerprint module is integrated.

In the above system login methods, a microcontroller unit (MCU) operating and controlling the fingerprint module needs to be used to store and process fingerprint data. Therefore, higher requirements are imposed on performance and memory capacity of the MCU. However, at present, many MCU products, especially MCU products in mass production fail to satisfy the requirements on the performance and memory capacity. As a result, the fingerprint modules using these MCUs fail to implement the corresponding system login function, or these MCUs need to be improved and upgraded into high-performance and high-memory capacity MCUs which may be used in the fingerprint modules to implement the corresponding system login function.

Apparently, if the MCUs are not improved and upgraded, the conventional fingerprint modules using the MCUs failing to satisfy the requirements may not implement the system login function. However, improving and upgrading these MCUs greatly increases implementation cost of logging in to the system by the fingerprint module.

SUMMARY

Embodiments of the present disclosure provide a fingerprint-based login method, an MCU, a fingerprint-based power assembly and an electronic terminal, to solve the problem that the fingerprint modules using the conventional MCUs failing to satisfy the requirements may not implement the system login function.

According to a first aspect of embodiments of the present disclosure, a fingerprint-based login method is provided. The fingerprint-based login method includes: waking up an operating system of a terminal device where a fingerprint sensor is disposed based on a detected non-press-type touch operation against the fingerprint sensor; controlling the fingerprint sensor to acquire fingerprint data based on a fingerprint data acquisition instruction sent by the waken-up operating system; storing the acquired fingerprint data to a designated security region in the terminal device by the waken-up operating system; and judging whether the fingerprint data stored in the designated security region matches fingerprint password data by the waken-up operating system upon detecting a press-type touch operation against the fingerprint sensor, such that a login operation is performed in the operating system if the stored fingerprint data matches the fingerprint password data.

According to a second aspect of embodiments of the present disclosure, an MCU is further provided. The MCU includes: a wake-up module, configured to wake up an operating system of a terminal device where a fingerprint sensor is disposed based on a detected non-press-type touch operation against the fingerprint sensor; an acquisition module, configured to control the fingerprint sensor to acquire fingerprint data based on a fingerprint data acquisition instruction sent by the waken-up operating system; a storage module, configured to store the acquired fingerprint data to a designated security region of the terminal device by the waken-up operating system; and a matching and login module, configured to judge whether the fingerprint data stored in the designated security region matches fingerprint password data by the waken-up operating system upon detecting a press-type touch operation against the fingerprint sensor, such that a login operation is performed in the operating system if the stored fingerprint data matches the fingerprint password data.

According to a third aspect of embodiments of the present disclosure, a fingerprint-based power assembly is further provided. The fingerprint-based power assembly includes a fingerprint sensor, a power button and an MCU, wherein the fingerprint sensor is integrated in the power button and is connected to the MCU, and the MCU is the MCU according to the second aspect of embodiments of the present disclosure.

According to a fourth aspect of embodiments of the present disclosure, an electronic terminal is further provided. The electronic terminal includes the MCU according to the second aspect of embodiments of the present disclosure, wherein the MCU is integrated in a fingerprint module of the electronic terminal, or the MCU is independent of the fingerprint module of the electronic terminal and is electrically connected to the fingerprint module.

In the fingerprint-based login method according to embodiments of the present disclosure, when the user only touches the fingerprint sensor but has not yet perform the press operation, the operating system of the terminal device is waken up. The operating system stores fingerprints acquired by the fingerprint sensor to the designated security region. After the user performs the press operation, the operating system performs the matching operation for the fingerprints. In one aspect, the fingerprint data acquired by the fingerprint sensor does not need to be stored in the MCU, and thus no a memory capacity of the MCU is not needed. In another aspect, the match operation for the fingerprints is performed by the operating system of the terminal device, and operation performance of the MCU is not needed. Apparently, with the solution according to this embodiment of the present disclosure, the performance or memory capacity of the used MCU may not be considered, and the login function of the system may be implemented under cooperation of the MCU and the operating system. This effectively solves the problem that the fingerprint modules using the conventional MCUs failing to satisfy the requirements fail to effectively implement the login function of the system.

In addition, once the non-press-type touch operation is performed, the operating system is woken up to acquire the fingerprint data; and when the press-type operation is performed subsequently, the operating system performs the match operation for the fingerprint data. This may effectively improve the speed and efficiency of fingerprint-based login, and enhance user experience.

BRIEF DESCRIPTION OF THE DRAWINGS

For clearer description of the technical solutions in embodiments of the present disclosure or in the related art, hereinafter, drawings that are to be referred for description of the embodiments or the related art are briefly described. Apparently, the drawings described hereinafter merely illustrate some embodiments of the present disclosure. Persons of ordinary skill in the art may also derive other drawings based on the drawings described herein without any creative effort.

DETAILED DESCRIPTION

To make the objectives, technical features, and advantages of the present disclosure clearer and more understandable, the technical solutions according to the embodiments of the present disclosure are further described in detail with reference to the accompany drawings. Apparently, the embodiments described herein are merely some exemplary ones, rather than all the embodiments of the present disclosure. Based on the embodiments of the present disclosure, all other embodiments derived by persons of ordinary skill in the art without any creative efforts shall fall within the protection scope of the embodiments of the present disclosure.

First Embodiment

Figure 1:
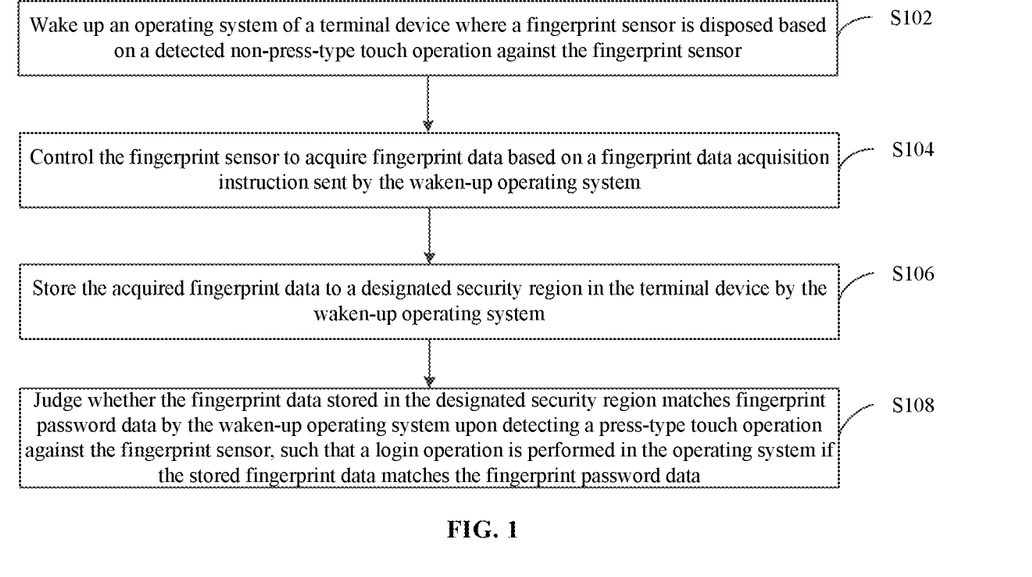
FIG. 1 is a flowchart of steps of a fingerprint-based login method according to a first embodiment of the present disclosure.

Referring to FIG. 1, a flowchart of steps of a fingerprint-based login method according to a first embodiment of the present disclosure is illustrated.

The fingerprint-based login method according to this embodiment includes the following steps:

Step S102: An operating system of a terminal device where a fingerprint sensor is disposed is woken up based on a detected non-press-type touch operation against the fingerprint sensor.

In this embodiment of the present application, touch operations are categorized into a non-press-type touch operation and a press-type touch operation. The non-press-type touch operation refers to only attaching a finger on the fingerprint sensor but not further pressing the fingerprint sensor. The press-type touch operation refers to attaching a finger on the fingerprint sensor and further pressing the fingerprint sensor.

The solution according to this embodiment of the present application may be used in a scenario where fingerprint-based login is performed in a non-operating state, for example, in a sleep state after the terminal device is powered on, that is, a scenario where the operating system is woken up from the non-operating state.

Step S104: The fingerprint sensor is controlled to acquire fingerprint data based on a fingerprint data acquisition instruction sent by the waken-up operating system.

After the operating system is woken up, a fingerprint data acquisition instruction is sent to an MCU. Upon receiving the instruction, the MCU controls the fingerprint sensor to acquire the fingerprint data. The fingerprint data is acquired before the user performs the press operation against the fingerprint sensor. That is, before the user performs the press operation against the fingerprint sensor, the operating system is woken up and the fingerprint data is acquired.

Step S106: The acquired fingerprint data is stored to a designated security region in the terminal device by the waken-up operating system.

The designated security region may be properly defined by a person skilled in the art according to the actual needs of the terminal device. The data stored in the designated security region may not be cleared with circumstances of state transition or the like of the operating system. In addition, the designated security region is not defined in the MCU, but is a region outside the MCU.

In the embodiment of the present disclosure, different from conventional storage of the fingerprint data, in one aspect, the storage operation is performed by the operating system; and in another aspect, the storage position is outside the MCU. Therefore, the requirements on the performance and storage capacity of the MCU may be lowered to some extent.

Step S108: Whether the fingerprint data stored in the designated security region matches fingerprint password data is judged by the waken-up operating system upon detecting a press-type touch operation against the fingerprint sensor, such that a login operation is performed in the operating system if the stored fingerprint data matches the fingerprint password data.

The fingerprint password data is fingerprint data that is registered in advance and used for decrypting or unlocking the operating system. The fingerprint password data may be stored by a person skilled in the art in a common storage manner according to the actual needs. For example, the fingerprint password data is encrypted and stored in a hard disk or the like of the terminal device.

In this embodiment of the present disclosure, when the non-press-type touch operation is performed against the fingerprint sensor, the operating system is woken up to acquire the fingerprint data; and when the press-type touch operation is performed against the fingerprint sensor, the waken-up operating system performs a match operation for the fingerprint data to determine whether the acquired fingerprint data is consistent with the fingerprint password data for use in logging in to the operating system. In this way, the speed and efficiency of fingerprint-based login may be effectively improved, and user experience may be improved.

When the acquired fingerprint data matches the registered fingerprint password data, the acquired fingerprint data is fingerprint data of an authorized user. In this case, the operating system performs the corresponding login operation.

In the fingerprint-based login method according to this embodiment, when the user only touches the fingerprint sensor but fails to perform the press-type touch operation, the operating system of the terminal device is woken up. The operating system stores fingerprints acquired by the fingerprint sensor to the designated security region. After the user performs the touch operation, the operating system performs the match operation for the fingerprints. In one aspect, the fingerprint data acquired by the fingerprint sensor does not need to be stored in the MCU, and thus no requirement is imposed on a memory capacity of the MCU. In another aspect, the match operation for the fingerprints is performed by the operating system of the terminal device, and no requirement is imposed on operation performance of the MCU. Apparently, with the solution according to this embodiment of the present disclosure, the performance or memory capacity of the used MCU may not be considered, and the login function of the system may be implemented under cooperation of the MCU and the operating system. This effectively solves the problem that the fingerprint modules using the conventional MCUs failing to satisfy the requirements fail to effectively implement the login function of the system.

In addition, when the non-press-type touch operation is performed, the operating system is woken up to acquire the fingerprint data; and when the press-type operation is performed subsequently, the operating system performs the match operation for the fingerprint data. This may effectively improve the speed and efficiency of fingerprint-based login, and enhance user experience.

The fingerprint-based login method according to this embodiment may be performed by any suitable processors capable of controlling the fingerprint module, including, but not limited to, the MCU controlling the fingerprint module.

Second Embodiment

Figure 2:
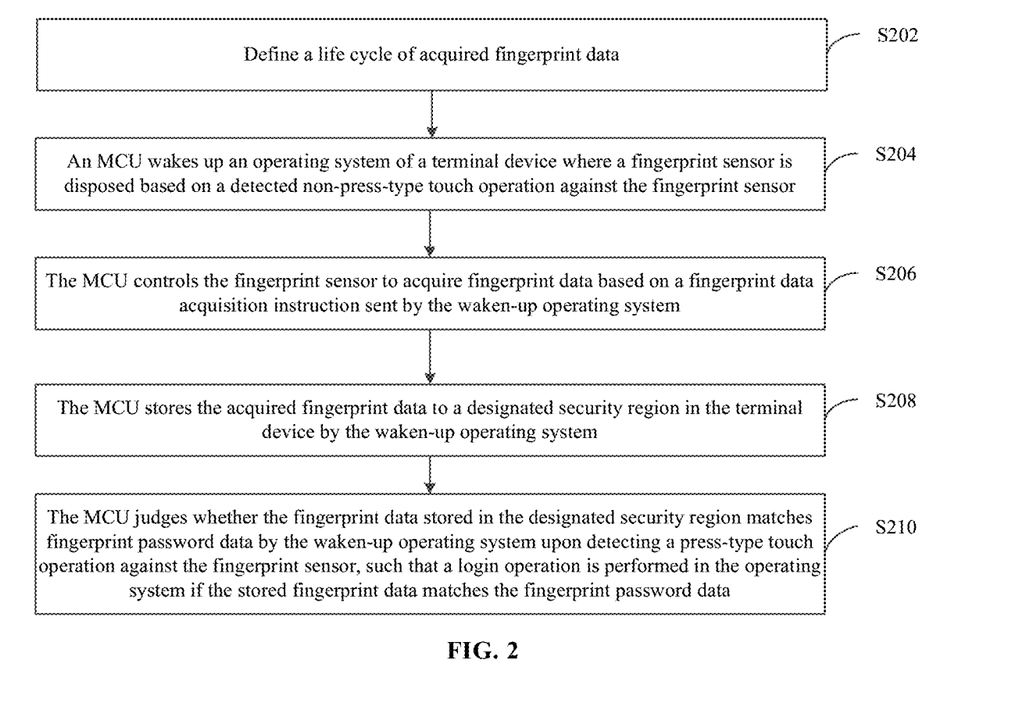
FIG. 2 is a flowchart of steps of a fingerprint-based login method according to a second embodiment of the present disclosure.

Referring to FIG. 2, a flowchart of steps of a fingerprint-based login method according to a second embodiment of the present disclosure is illustrated.

The fingerprint-based login method according to this embodiment includes the following steps:

Step S202: A life cycle of acquired fingerprint data is defined.

A person skilled in the art may define the life cycle of the acquired fingerprint data by an interface provided by an operating system of a terminal device. The life cycle is shorter than the wake-up cycle of an MCU.

In this embodiment, the MCU is configured to operate and control a fingerprint sensor and a fingerprint module where the fingerprint sensor is disposed. The fingerprint module and the MCU may be integrally arranged, or may be independently arranged. When the fingerprint module and the MCU are independently arranged, the fingerprint module is electrically connected to the MCU to operate and control the fingerprint module.

The MCU itself has a specific wake-up cycle and a sleep cycle. The wake-up cycle and the sleep cycle may be specifically properly defined by a person skilled in the art according to the actual needs, which are not limited in the embodiment of the present disclosure. For example, the MCU is woken up at the first second, and is in a waken-up state within a period from the first to fifth seconds; the MCU falls asleep at the sixth second, and enters a sleep mode; the MCU is woken up again at the seventh second, and is in the waken-up state within a period from the seventh to eleventh seconds; and the MCU falls asleep at the twelfth second, and enters the sleep state, . . . , and such steps are repeated. That is, the MCU sleeps for one second every five seconds.

Corresponding to wake-up of the MCU, in this embodiment, a life cycle may be defined for the fingerprint data acquired each time by the operating system to prevent security risks. The life cycle is shorter than the wake-up cycle of the MCU. For example, when the wake-up cycle of the MCU is 5 seconds, the life cycle of the fingerprint data may be defined as 3 seconds or 4 seconds or the like. Accordingly, each time the MCU is woken up, fingerprint data needs to be re-acquired. The fingerprint data is valid within the current life cycle.

When the fingerprint sensor is pressed within the life cycle of the fingerprint data, subsequent operations may be performed based on the current fingerprint data; and otherwise, fingerprint data needs to be re-acquired, and then the subsequent operations are performed.

It should be noted that this step is optional. In practice, the life cycle may also not be defined, and instead a default life cycle may be used, which is also applicable to the solution according to the embodiment of the present disclosure. The life cycle is defined at one time during initialization, and may be used for a long time where no modification is desired. Therefore, the life cycle does not need to be defined each time fingerprint-based login is performed or each time the terminal device is powered on.

Step S204: The MCU wakes up an operating system of a terminal device where a fingerprint sensor is disposed based on a detected non-press-type touch operation against the fingerprint sensor.

The fingerprint sensor is arranged in the fingerprint module, the fingerprint module is electrically connected to a processor of the terminal device, such that the operating system may be woken up by the processor in a suitable way where necessary.

In one feasible implementation, the fingerprint module where the fingerprint sensor is disposed is connected to the processor of the terminal device via a universal serial bus (USB). In this implementation, the processor may be remotely woken up by the USB, and hence the operating system is woken up. That is, in this implementation, the MCU sends a remote wake-up electrical signal via the USB, and wakes up the operating system via the remote wake-up electrical signal. By the USB, the implementation is more general, and good compatibility is achieved.

In another feasible implementation, the fingerprint module where the fingerprint sensor is disposed is connected to the processor of the terminal device via a serial peripheral interface (SPI) bus or a general purpose input output (GPIO) bus. The GPIO bus is used for control signal interaction, and the SPI bus is used for data transmission. In this implementation, an interrupt signal may be sent via the GPIO bus to wake up the processor, and hence to wake up the operating system. That is, in this implementation, an interrupt signal is sent via the GPIO bus, and the operating system is woken up by the interrupt signal. By the GPIO bus, the processor and the operating system may be woken up by the interrupt signal, and therefore, the implementation is simple and the cost is low.

A person skilled in the art may understand that, in practice, the USB, the GPIO bus and the SPI bus may be simultaneously deployed or may be selectively used according to the actual needs.

Step S206: The MCU controls the fingerprint sensor to acquire fingerprint data based on a fingerprint data acquisition instruction sent by the waken-up operating system.

During acquisition of the fingerprint data by the fingerprint sensor, the waken-up operating system sends a fingerprint data acquisition instruction, and the MCU controls the fingerprint sensor to acquire the fingerprint data based on the fingerprint data acquisition instruction sent by the waken-up operating system. In this manner, acquisition of the fingerprint data is controlled by the operating system. In one aspect, the load of the MCU is relieved, and the requirement on the processing performance of the MCU is lowered. In another aspect, the operating system is ensured to be in the waken-up state, such that the acquired fingerprint data is subsequently processed.

In specific practice, since the MCU has a specific wake-up cycle, when the MCU controls the fingerprint sensor to acquire the fingerprint data based on the fingerprint data acquisition instruction sent by the wake-up operating system, the MCU sends a wake-up event notification to the operating system when the MCU is woken up in each wake-up cycle; and the MCU receives the fingerprint data acquisition instruction sent by the operating system each time upon receiving the wake-up event notification, and controls the fingerprint sensor to acquire the fingerprint data based on the fingerprint data acquisition instruction. Apparently, controlling the MCU to acquire the fingerprint data within each wake-up cycle by the operating system ensures that the fingerprint data acquisition instruction is effectively executed, such that the efficiency of fingerprint data acquisition is entirely improved.

It should be noted that when the fingerprint module where the fingerprint sensor is disposed is connected to the processor of the terminal device via the SPI bus and the GPIO bus, the operating system sends the fingerprint data acquisition instruction to the MCU via the SPI bus. That is, the MCU controls the fingerprint sensor to acquire the fingerprint data based on the fingerprint data acquisition instruction sent by the waken-up operating system via the SPI bus.

Step S208: The MCU stores the acquired fingerprint data to a designated security region in the terminal device by the waken-up operating system.

In this step, the designated security region is a region which is outside the MCU and has specific security.

In one possible implementation, the designated security region may be a trusted execution environment (TEE) region in the terminal device.

The TEE is a running environment coexistent with Rich OS (for example, Android or the like) on the terminal device, and provides security services for the Rich OS. The TEE has its own execution space, and has a higher security level over the Rich OS but a lower security level over a security element (SE), for example, a smart card. Software and hardware resources that are accessible by the TEE are separated from the Rich OS. The TEE provides a security execution environment for authorized security software (trusted application, TA), and also protects confidentiality, integrity and access permission of resources and data of the TA. From the perspective of cost, the TEE provides a balance between security and cost. Apparently, use of the TEE as the designated security region not only ensures security of the fingerprint data, but also controls the implementation cost of fingerprint-based login.

However, the designated security region is not limited to the TEE. In practice, a person skilled in the art may use other suitable security regions according to the actual conditions of the terminal device, to implement the solution according to the embodiment of the present disclosure.

Step S210: The MCU judges whether the fingerprint data stored in the designated security region matches fingerprint password data by the waken-up operating system upon detecting a press-type touch operation against the fingerprint sensor, such that a login operation is performed in the operating system if the stored fingerprint data matches the fingerprint password data.

After a user performs a press-type touch operation against the fingerprint sensor, the waken-up operating system performs a fingerprint match operation to determine whether the fingerprint data stored in the designated security region matches registered fingerprint password data. If the fingerprint data stored in the designated security region matches the registered fingerprint password data, the operating system may be logged in; and otherwise, the operating system may not be logged in, and in this case, an error prompt is generated or no operation is performed.

In this embodiment, if step S202 is performed, the acquired fingerprint data has a defined life cycle. The life cycle is shorter than the wake-up cycle of the MCU. In this case, after the MCU stores the acquired fingerprint data to the designated security region or the TEE by the waken-up operating system, storage and clearance of the fingerprint data are both controlled by the operating system. The operating system may start a timer upon determining that the fingerprint data is stored to the TEE. A timing duration of the timer is equal to the duration of the life cycle of the fingerprint data.

Based on the life cycle of the fingerprint data, upon detecting a press-type touch operation against the fingerprint sensor, the MCU may judge whether an operation time of the press-type touch operation is within the life cycle of the currently acquired fingerprint data by the operating system. If the operation time of the press-type touch operation is within the life cycle of the currently acquired fingerprint data, the MCU judges whether the fingerprint data stored in the designated security region matches the fingerprint password data by the operating system. That is, if the operating system determines that the timer does not expire, it may be determined that the fingerprint data is just within the life cycle of the fingerprint data when the press-type touch operation is performed, and thus the fingerprint match operation may be directly performed. This ensures the accuracy of fingerprint matching, and meanwhile ensures the efficiency of fingerprint matching.

However, if the operating time of the press-type touch operation is not within the life cycle of the fingerprint data, a press event notification is sent to the waken-up operating system; after the fingerprint data acquisition instruction sent by the operating system based on the press event notification is received, the fingerprint sensor is controlled to re-acquire a fingerprint data, and the re-acquired fingerprint data is stored to the designated security region by the operating system; and whether the re-acquired fingerprint data in the designated security region matches the fingerprint password data is judged by the operating system. That is, if the operating system determines that the timer expires, it may be determined that the fingerprint data becomes invalid when the press-type touch operation is performed, and thus the fingerprint data needs to be re-acquired. Accordingly, the MCU according to this embodiment sends a press event notification to the operating system. Upon receiving the press event notification, the operating system sends a corresponding fingerprint data acquisition instruction. Upon receiving the instruction, the MCY re-acquires the fingerprint data, and performs a match operation for the re-acquired fingerprint data. In this way, the effectiveness of the fingerprint data and the accuracy of fingerprint matching are ensured.

Under the circumstance where the MCU sends the press event notification to the operating system, if the operating system determines that the operation time of the press-type touch operation is within the life cycle of the currently acquired fingerprint data based on the notification, the notification may be ignored; and if the operating system determines that the operation time of the press-type touch operation is not within the life cycle of the fingerprint data based on the notification, the operation of instructing the MCU to re-acquire the fingerprint data may be performed.

When the login operation is performed in the operating system, if the fingerprint module is separated from a power button, upon successful fingerprint matching, the screen of the terminal device is woken up by the operating system, and the operating system is logged in. In this case, waking up the screen and logging into the operating system may be simultaneously performed.

If the fingerprint module where the fingerprint sensor is disposed is integrated in the power button of the terminal device, after a press-type touch operation against the power button is detected, the screen of the terminal device is woken up by the operating system, and whether the fingerprint data stored in the designated security region matches the fingerprint password data is judged by the operating system. If the fingerprint data stored in the designated security region matches the fingerprint password data, the login operation is performed in the operating system. In this case, the screen is woken up firstly and then the operating system is logged in. Even if fingerprint matching fails, the screen may still be woken up. This enhances user experience.

Hereinafter, the above process is exemplarily described using a specific embodiment.

In this embodiment, the fingerprint module is integrated in the power button, and when the power button is pressed, the fingerprints are acquired. Accordingly, the operating system may be successfully woken up and logged in by pressing the power button once, thereby implementing one-button login.

In addition, in this embodiment, the operating system is designed to support a modern standby mode, and the acquired fingerprint data is stored in the TEE security region. The TEE employs Intel SGX. The MCU and the fingerprint module are integrally arranged. The MCU sends a remote wake-up electrical signal via the USB, and the operating system is woken up in a remote wake-up fashion.

The modern standby mode is an upgrade of an S3 mode, and the operating system is more power saving in the modern standby mode. In addition, the S3 mode and the modern standby mode both support the TEE. However, in the S3 mode, it takes a long time (2 or 3 seconds) to wake up the operating system. After the operating system is woken up, the user's finger may leave the fingerprint sensor. Therefore, it may not be ensured that the fingerprint data is acquired and stored to the TEE. However, in the modern standby mode, the operating system is woken up within a shorter time (for example, 100 ms). After the operating system is woken up, the fingerprint data may be effectively acquired and stored to the TEE.

Intel Software Guard Extensions (Intel SGX) is an extension of the Intel architecture (IA), and is intended to enhance security of software. With the Intel SGX, not all malware on a platform may be identified and isolated, and instead, security operations of legitimate software are packaged in an enclave to prevent these operations from being attacked by the malware. Neither Privileged software nor non-privileged software can access the enclave. That is, once the software and data are included in the enclave, even the operating system may not access code and data in the enclave. A security border of the enclave only includes a CPU and the enclave itself. An enclave created by the SGX may be understood as a trusted execution environment (TEE).

Figure 3:
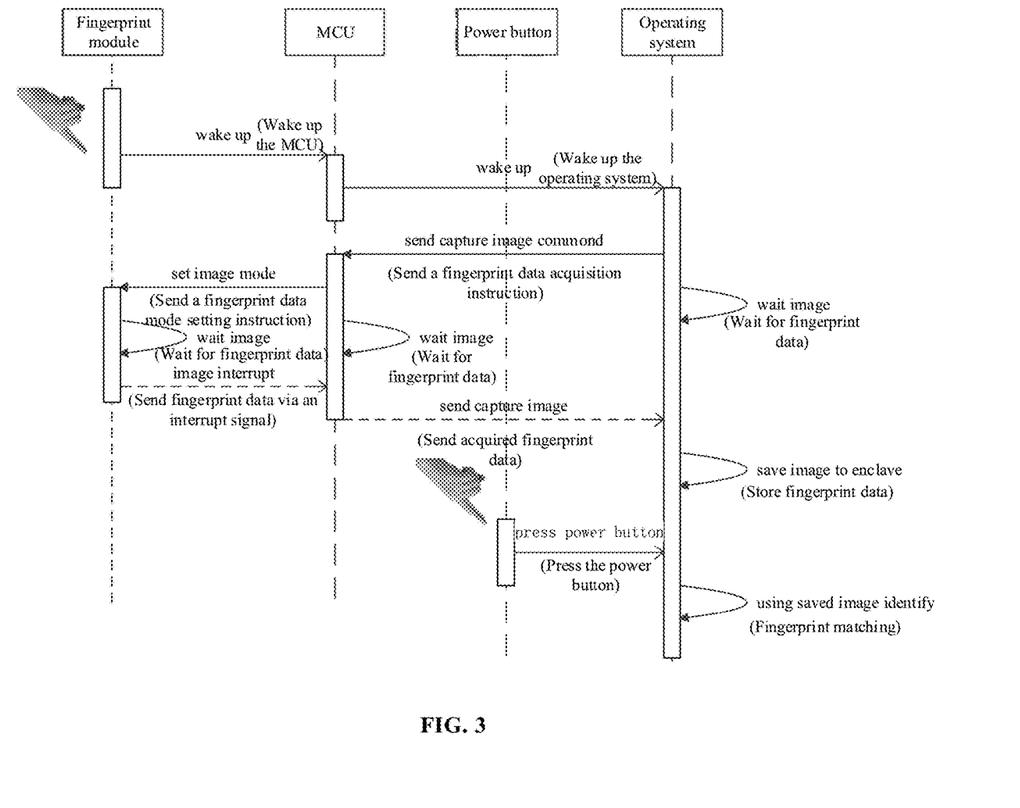
FIG. 3 is a schematic diagram of interactions in a fingerprint-based login process according to the embodiment as illustrated in FIG. 2.

Based on the above configurations, a schematic diagram of interactions in a fingerprint-based login process is as illustrated in FIG. 3. After the operating system enters the modern standby mode, a finger touches the fingerprint sensor in the fingerprint module; the fingerprint module firstly wakes up the MCU; the MCU wakes up the operating system; the operating system sends the fingerprint data acquisition instruction to the MCU; and upon receiving the fingerprint data acquisition instruction, the MCU controls the fingerprint module to acquire one frame of fingerprint data (including sending a fingerprint data mode setting instruction, receiving fingerprint data sent via an interrupt signal and the like) by the fingerprint sensor. Afterwards, the MCU sends the acquired fingerprint data to the operating system; and the operating system stores the fingerprint data to the enclave of the Intel SGX. The finger further presses the power button to wake up the screen (that is, lighting the screen). After the screen is woken up, the fingerprint matching is performed directly based on the fingerprint data stored in the enclave, and upon successfully matching, the operating system is directly logged in.

Through the above process, by means of remote wake-up, when the power button is touched, the operating system is firstly woken up, and then current fingerprint data is acquired and stored to the TEE. After the power button is pressed, the screen of the terminal device is lit on, and the matching operation is performed directly based on the fingerprint data stored in the TEE. This not only implements on-button login, but also protects the fingerprint data.

In addition, to prevent security risks due to long-term validity of the fingerprint data in the process of one-button login, this embodiment further provides a life cycle for the acquired fingerprint data, for example, 4 seconds. The finger touches the fingerprint module to trigger acquisition of the fingerprint data, and the acquired fingerprint data is automatically cleared 4 seconds later. Within the 4-second life cycle of the fingerprint data, when the finger presses the power button, the acquired fingerprint may be used to implement one-button login, and on the contrary, one-button login may not be implemented.

Figure 4:
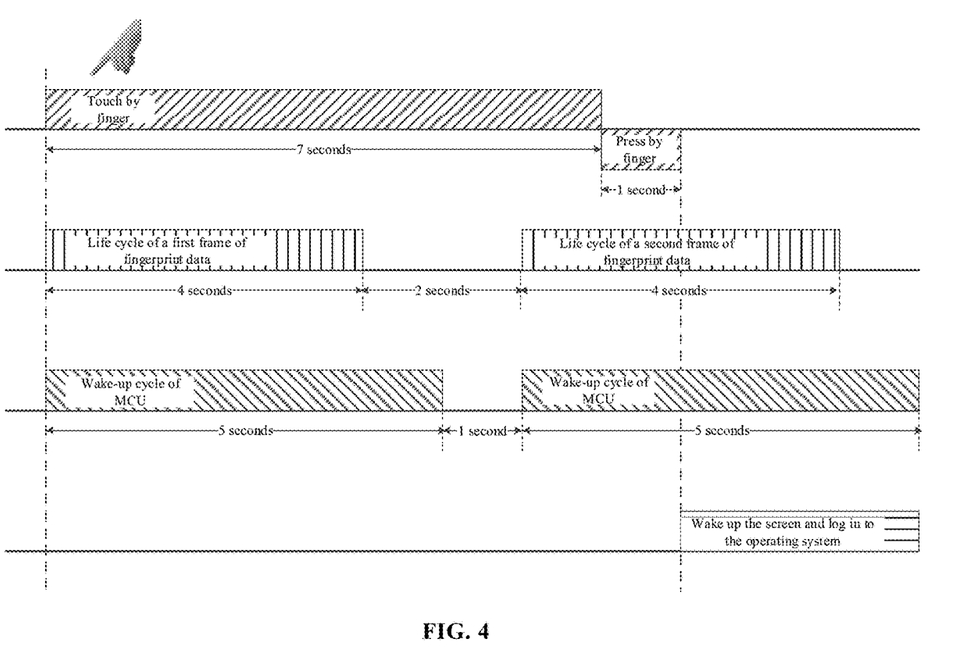
FIG. 4 is a schematic diagram of a time sequence of operations for one fingerprint-based login according to the embodiment as illustrated in FIG. 2.

A schematic diagram of a time sequence of operations for one fingerprint-based login based on the above life cycle is as illustrated in FIG. 4. The acquired fingerprint data is still within the life cycle when the finger presses the power button. In FIG. 4, an uppermost first column illiterates a touch operation by a finger, where the fingerprint performs a non-press-type touch operation against a fingerprint module within the first 7 seconds, and performs a press-type touch operation at the eighth second; a middle second column illustrates a life cycle of acquired fingerprint data, where start time of the life cycle of the fingerprint data is the same as start time of a wake-up cycle of an MCU, and the life cycle of the fingerprint data is 4 seconds. In FIG. 4, an acquired first frame of fingerprint data is valid within the first to fourth seconds, and 2 seconds later when the MCU is woken up again, a second frame of fingerprint data is acquired, and the second frame of fingerprint data is valid within the seventh to tenth seconds. In FIG. 4, a middle third column illustrates a wake-up cycle and a sleep cycle of the MCU, where the wake-up cycle is 5 seconds, and the sleep cycle is 1 second. As seen from FIG. 4, the MCU is in a waken-up state within the first to fifth seconds, in a sleep state at the sixth second, in the waken-up state again within the seventh to eleventh seconds, and in the sleep state again at the twelfth second. In FIG. 4, a lower most fourth column illustrates a state of the operating system, where when the finger in the first column performs a press-type touch operation at the eighth second, the operating system wakes up the screen and is logged in.

Figure 5:
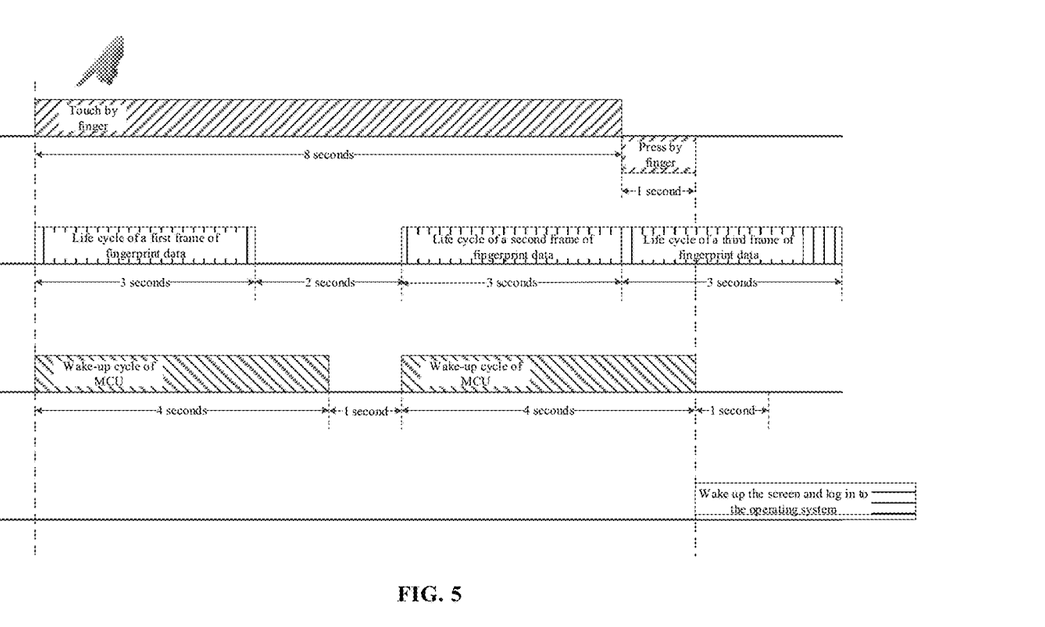
FIG. 5 is a schematic diagram of a time sequence of operations for another fingerprint-based login according to the embodiment as illustrated in FIG. 2.

A schematic diagram of a time sequence of operations for another fingerprint-based login based on the above life cycle is as illustrated in FIG. 5. FIG. 5 illustrates a scenario of one-button login when the fingerprint data becomes invalid. This scenario is caused due to clearance of the fingerprint data prior to a touch operation. That is, after the fingerprint data is cleared, a power button press event is generated. Accordingly, a power button press notification is additionally provided. Upon detecting that the power button is pressed, the MCU sends a press event notification to the operating system. Upon receiving the press event notification, the operating system re-sends a fingerprint data acquisition instruction for re-acquiring one frame of fingerprint data. This prevents failure to implement one-button login due to clearance of the fingerprint data.

The life cycle of the fingerprint illustrated in FIG. 5 is different from that in FIG. 4, and is defined as 3 seconds. A wake-up cycle of an MCU illustrated in FIG. 5 is also different from that in FIG. 4, and is defined as 4 seconds. As illustrated in FIG. 5, an uppermost first column illustrates a touch operation by a finger, where the finger performs a non-press-type touch operation against the fingerprint module within the first 7 seconds, and performs a press-type touch operation at the ninth second; and a middle second column illustrates a life cycle of acquired fingerprint data, where start time of the life cycle of the fingerprint data is the same as start time of the wake-up cycle of the MCU, and the life cycle of the fingerprint data is 3 seconds. In FIG. 5, an acquired first frame of fingerprint data is valid within the first to third seconds, and 2 seconds later when the MCU is woken up again, a second frame of fingerprint data is acquired, the second frame of fingerprint data is valid within the sixth to eighth seconds, and 2 seconds later, a next acquisition cycle of the fingerprint data arrives. In FIG. 5, a middle third column illustrates a wake-up cycle and a sleep cycle of the MCU, where the wake-up cycle is 4 seconds, and the sleep cycle is 1 second. As seen from FIG. 5, the MCU is in a waken-up state within the first to fourth seconds, in a sleep state at the fifth second, in the waken-up state again within the sixth to ninth seconds, and in the sleep state at the tenth second. In FIG. 5, a lowermost fourth column illustrates a state of the operating system, where when the finger in the first column performs a press-type touch operation at the ninth second, a life cycle of the second frame of fingerprint data expires, and in this case, the MCU needs to sends a press event notification to the operating system to further instruct the MCU to acquire fingerprint data. The MCU re-acquires fingerprint data at the ninth second. If the operating system determines that the re-acquired fingerprint data matches fingerprint password data, the operating system wakes up the screen and is logged in.

Apparently, according to this embodiment, when the user only touches the fingerprint sensor but fails to perform the press operation, the operating system of the terminal device is woken up. The operating system stores fingerprints acquired by the fingerprint sensor to the designated security region. After the user performs the touch operation, the operating system performs the matching operation for the fingerprints. In one aspect, the fingerprint data acquired by the fingerprint sensor does not need to be stored in the MCU, and thus no requirement is imposed on a memory capacity of the MCU. In another aspect, the match operation for the fingerprints is performed by the operating system of the terminal device, and no requirement is imposed on operation performance of the MCU. Apparently, with the solution according to this embodiment of the present disclosure, the performance or memory capacity of the used MCU may not be considered, and the login function of the system may be implemented under cooperation of the MCU and the operating system. This effectively solves the problem that the fingerprint modules using the conventional MCUs failing to satisfy the requirements fail to effectively implement the login function of the system.

In addition, when the non-press-type touch operation is performed, the operating system is woken up to acquire the fingerprint data; and when the press-type operation is performed subsequently, the operating system performs the match operation for the fingerprint data. This may effectively improve the speed and efficiency of fingerprint-based login, and enhance user experience. The life cycle of the acquired fingerprint data is defined such that security of the fingerprint data is further ensured.

Third Embodiment

Figure 6:
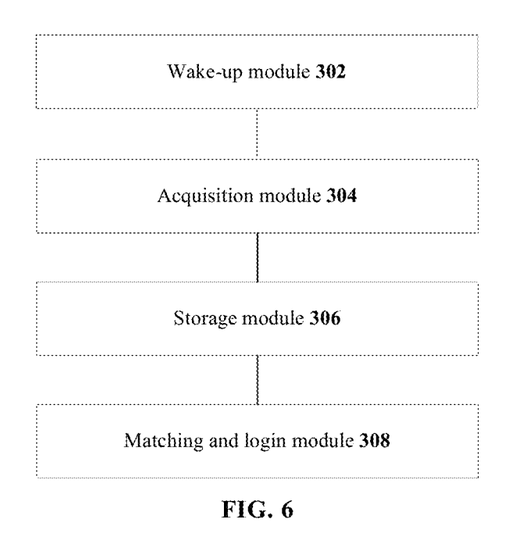
FIG. 6 is a structural block of an MCU according to a third embodiment of the present disclosure.

Referring to FIG. 6, a structural block of an MCU according to a third embodiment of the present disclosure is illustrated.

The MCU according to this embodiment includes: a wake-up module 302, configured to wake up an operating system of a terminal device of a fingerprint sensor based on a detected non-press-type touch operation against the fingerprint sensor; an acquisition module 304, configured to control the fingerprint sensor to acquire fingerprint data based on a fingerprint data acquisition instruction sent by the waken-up operating system; a storage module 306, configured to store the acquired fingerprint data to a designated secure region of the terminal device by the waken-up operating system; and a matching and login module 308, configured to judge whether the fingerprint data stored in the designated secure region matches fingerprint password data by the waken-up operating system upon detecting a press contact operation against the fingerprint sensor, such that a login operation is performed in the operating system if the stored fingerprint data matches the fingerprint password data.

According to this embodiment, when the user only touches the fingerprint sensor but fails to perform the press operation, the operating system of the terminal device is woken up. The operating system stores fingerprints acquired by the fingerprint sensor to the designated security region. After the user performs the touch operation, the operating system performs the matching operation for the fingerprints. In one aspect, the fingerprint data acquired by the fingerprint sensor does not need to be stored in the MCU, and thus no requirement is imposed on a memory capacity of the MCU. In another aspect, the match operation for the fingerprints is performed by the operating system of the terminal device, and no requirement is imposed on operation performance of the MCU. Apparently, with the solution according to this embodiment of the present disclosure, the performance or memory capacity of the used MCU may not be considered, and the login function of the system may be implemented under cooperation of the MCU and the operating system.

This effectively solves the problem that the fingerprint modules using the conventional MCUs failing to satisfy the requirements fail to effectively implement the login function of the system.

In addition, when the non-press-type touch operation is performed, the operating system is woken up to acquire the fingerprint data; and when the press-type operation is performed subsequently, the operating system performs the match operation for the fingerprint data. This may effectively improve the speed and efficiency of fingerprint-based login, and enhance user experience.

Fourth Embodiment

Figure 7:
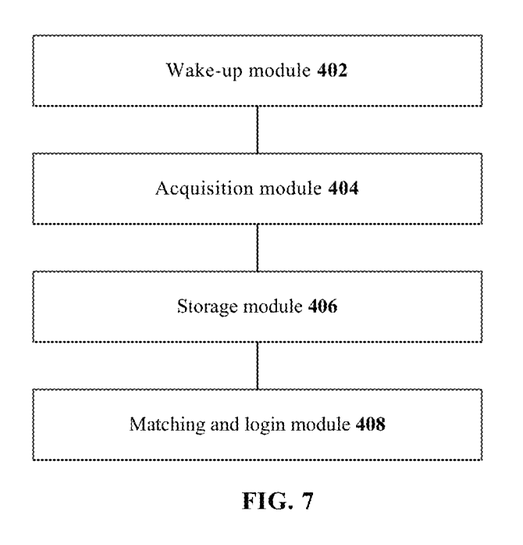
FIG. 7 is a structural block of an MCU according to a fourth embodiment of the present disclosure.

Referring to FIG. 7, a structural block of an MCU according to a fourth embodiment of the present disclosure is illustrated.

The MCU according to this embodiment includes: a wake-up module 402, configured to wake up an operating system of a terminal device of a fingerprint sensor based on a detected non-press-type touch operation against the fingerprint sensor; an acquisition module 404, configured to control the fingerprint sensor to acquire fingerprint data based on a fingerprint data acquisition instruction sent by the waken-up operating system; a storage module 406, configured to store the acquired fingerprint data to a designated secure region of the terminal device by the waken-up operating system; and a matching and login module 408, configured to judge whether the fingerprint data stored in the designated secure region matches fingerprint password data by the waken-up operating system upon detecting a press contact operation against the fingerprint sensor, such that a login operation is performed in the operating system if the stored fingerprint data matches the fingerprint password data.

Optionally, the acquisition module 404 is further configured to: send a wake-up event notification to the operating system when the MCU is woken up in each wake-up cycle; and receive the fingerprint data acquisition instruction sent by the operating system each time upon receiving the wake-up event notification, and control the fingerprint sensor to acquire the fingerprint data based on the fingerprint data acquisition instruction.

Optionally, the acquired fingerprint data has a defined life cycle. The life cycle is shorter than the wake-up cycle of the MCU.

Optionally, the matching and login module 408 is further configured to: judge whether an operation time of the press-type touch operation is within the life cycle of the currently acquired fingerprint data by the operating system upon detecting the press-type touch operation against the fingerprint sensor; and judge whether the fingerprint data stored in the designated security region matches the fingerprint password data by the waken-up operating system if the operation time is within the life cycle of the currently acquired fingerprint data.

Optionally, the matching and login module 408 is further configured to: send a press event notification to the waken-up operating system if the operation time of the press-type touch operation is not within the life cycle of the currently acquired fingerprint data; upon receiving the fingerprint data acquisition instruction sent by the operating system based on the press event notification, control the fingerprint sensor to re-acquire the fingerprint data, and store the re-acquired fingerprint data to the designated security region by the operating system; and judge whether the re-acquired fingerprint data in the designated security region matches the fingerprint password data by the operating system.

Optionally, the designated security region in the terminal device is a TEE region in the terminal device.

Optionally, a fingerprint module where the fingerprint sensor is disposed is connected to a processor of the terminal device via a USB; and the wake-up module 402 is further configured to send a remote wake-up electrical signal via the USB bus, and remotely wake up the operating system by the remote wake-up electrical signal.

Optionally, a fingerprint module where the fingerprint sensor is disposed is connected to a processor of the terminal device via a GPIO bus or an SPI bus; the wake-up module 402 is further configured to send an interrupt signal via a GPIO bus, and wake up the operating system by the interrupt signal; and the acquisition module 404 is further configured to control the fingerprint sensor to acquire the fingerprint data based on the fingerprint data acquisition instruction sent by the waken-up operating system via the SPI bus.

Optionally, the matching and login module 408 is further configured to judge whether the fingerprint data stored in the designated security region matches fingerprint password data by the waken-up operating system upon detecting a press-type touch operation against the fingerprint sensor, such that a screen of the terminal device is woken up by the operating system and the operating system is logged in if the stored fingerprint data matches the fingerprint password data.

Optionally, the fingerprint module where the fingerprint sensor is disposed is integrated in a power button of the terminal device.

Optionally, the matching and login module 408 is further configured: upon detecting a press-type touch operation against the power button, wake up a screen of the terminal device by the operating system, and judge whether the fingerprint data stored in the designated security region matches the fingerprint password data by the operating system, such that a login operation is performed in the operating system if the stored fingerprint data matches the fingerprint password data.

The MCU according to this embodiment is configured to implement the corresponding fingerprint-based login methods according to the above method embodiments, and achieves the corresponding technical effects as disclosed in the method embodiments, which are not described herein any further.

In addition, an embodiment of the present disclosure further provides a fingerprint-based power assembly. The fingerprint-based power assembly includes a fingerprint sensor, a power button and a microcontroller unit. The fingerprint sensor is integrated in the power button and is connected to the microcontroller unit. The MCU of embodiment 4 is the MCU as described in the third or fourth embodiment. Optionally, in the fingerprint-based power assembly, the MCU may also be integrated in a fingerprint module where the fingerprint sensor is disposed.

In addition, an embodiment of the present disclosure further provides an electronic terminal. The electronic terminal includes the MCU as described in the third or fourth embodiment. The MCU may be integrated in a fingerprint module of the electronic terminal. Alternatively, the MCU may be independent from the fingerprint module of the electronic terminal, and is electrically connected to the fingerprint module.

The above described apparatus embodiments are merely for illustration purpose only. The modules which are described as separate components may be physically separated or may be not physically separated, and the components which are illustrated as modules may be or may not be physical modules, that is, the components may be located in the same position or may be distributed into a plurality of network modules. A part or all of the modules may be selected according to the actual needs to achieve the objectives of the technical solutions of the embodiments. Persons of ordinary skill in the art may understand and implement the present disclosure without paying any creative effort.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a computer readable storage medium. The computer-readable storage medium includes any mechanism for storing or transferring information in a computer readable form. For example, the computer-readable medium includes a read-only memory (ROM), a random access memory (RAM), a disk storage medium, an optical storage medium, a flash storage medium, electricity, light, sound and other forms of propagation signals (for example, a carrier, an infrared signal, a digital signal and the like) and the like. The computer software product includes several instructions for instructing a computer device (which may be a personal computer, a server or a network device) to perform all the embodiments or some parts of the embodiments.

Finally, it should be noted that the above embodiments are merely intended to describe the technical solutions of the embodiments of the present disclosure, instead of limiting the present disclosure. Although the present disclosure is described in detail with reference to the above embodiments, persons of ordinary skill in the art should understand that various modifications may be made to the technical solutions described in the above embodiments or equivalent replacements may be made to some technical features thereof, without departing from the spirit and scope of the technical solutions of the embodiments of the present disclosure.

What is claimed is:

1. A fingerprint-based login method, comprising:
    waking up an operating system of a terminal device where a fingerprint sensor is disposed to be responsive to a detected non-press-type touch operation of a user against the fingerprint sensor, wherein the non-press-type touch operation is an operation of engaging a finger of the user on the fingerprint sensor without pressing the fingerprint sensor;
    controlling the fingerprint sensor to acquire fingerprint data based on a fingerprint data acquisition instruction sent by the operating system that has been waken up;
    storing the acquired fingerprint data to a designated security region in the terminal device by the operating system that has been waken up; and
    judging whether the fingerprint data stored in the designated security region matches fingerprint password data by the operating system that has been waken up to be responsive to a detected press-type touch operation against the fingerprint sensor, such that a login operation of the operating system is performed when the stored fingerprint data matches the fingerprint password data, wherein the press-type touch operation is an operation of engaging the finger of the user on the fingerprint sensor and further pressing the fingerprint sensor,
    wherein the judging whether the fingerprint data stored in the designated security region matches fingerprint password data by the operating system that has been waken up to be responsive to a detected press-type touch operation against the fingerprint sensor comprises:
    judging whether an operation time of the press-type touch operation is within a life span of currently acquired fingerprint data by the operating system to be responsive to the detected press-type touch operation against the fingerprint sensor; and judging whether the fingerprint data stored in the designated security region matches the fingerprint password data by the operating system that has been waken up when the operation time of the press-type touch operation is within the life span of the currently acquired fingerprint data.

2. The method according to claim 1, wherein the controlling the fingerprint sensor to acquire fingerprint data based on a fingerprint data acquisition instruction sent by the operating system that has been waken up comprises:
    sending, by a microcontroller unit (MCU) configured to control the fingerprint sensor, a wake-up event notification to the operating system when the MCU is woken up in each wake-up cycle; and
    receiving, by the MCU, the fingerprint data acquisition instruction sent by the operating system each time upon receiving the wake-up event notification, and controlling the fingerprint sensor to acquire the fingerprint data based on the fingerprint data acquisition instruction.

3. The method according to claim 2, wherein the life span of the currently acquired fingerprint data is shorter than the wake-up cycle of the MCU.

4. The method according to claim 1, further comprising:
    sending a press event notification to the operating system that has been waken up when the operation time of the press-type touch operation is not within the life span of the currently acquired fingerprint data;
    controlling the fingerprint sensor to re-acquire a fingerprint data upon receiving the fingerprint data acquisition instruction sent by the operating system based on the press event notification, and storing the re-acquired fingerprint data to the designated security region by the operating system; and
    judging whether the re-acquired fingerprint data in the designated security region matches the fingerprint password data by the operating system.

5. The method according to claim 1, wherein a fingerprint module where the fingerprint sensor is disposed is connected to a processor of the terminal device via a USB, and the waking up an operating system of a terminal device where a fingerprint sensor is disposed comprises: sending a remote wake-up electrical signal via the USB, and remotely waking up the operating system by the remote wake-up electrical signal; or
    wherein a fingerprint module where the fingerprint sensor is disposed is connected to a processor of the terminal device via a GPIO bus or an SPI bus, and the waking up an operating system of a terminal device where a fingerprint sensor is disposed comprises: sending an interrupt signal via the GPIO bus, and remotely waking up the operating system by the interrupt signal, the controlling the fingerprint sensor to acquire fingerprint data based on a fingerprint data acquisition instruction sent by the operating system that has been waken up comprises: controlling the fingerprint sensor to acquire the fingerprint data based on the fingerprint data acquisition instruction sent by the operating system that has been waken up via the SPI bus.

6. The method according to claim 1, wherein the performing the login operation of the operating system comprises: waking up a screen of the terminal device by the operating system, and logging in to the operating system.

7. The method according to claim 1, wherein the judging whether the fingerprint data stored in the designated security region matches fingerprint password data by the operating system that has been waken up to be responsive to a detected press-type touch operation against the fingerprint sensor comprises:
being responsive to detecting a press-type touch operation against the power button, waking up a screen of the terminal device by the operating system, and judging whether the fingerprint data stored in the designated security region matches the fingerprint password data by the operating system.

8. A microcontroller unit (MCU), comprising:
a wake-up module, configured to wake up an operating system of a terminal device where a fingerprint sensor is disposed to be responsive to a detected non-press-type touch operation of a user against the fingerprint sensor, wherein the non-press-type touch operation is an operation of engaging a finger of the user on the fingerprint sensor without pressing the fingerprint sensor;
an acquisition module, configured to control the fingerprint sensor to acquire fingerprint data based on a fingerprint data acquisition instruction sent by the operating system that has been waken up;
a storage module, configured to store the acquired fingerprint data to a designated security region of the terminal device by the operating system that has been waken up; and
a matching and login module, configured to judge whether the fingerprint data stored in the designated security region matches fingerprint password data by the operating system that has been waken up to be responsive to a detected press-type touch operation against the fingerprint sensor, such that a login operation of the operating system is performed when the stored fingerprint data matches the fingerprint password data, wherein the press-type touch operation is an operation of engaging the finger of the user on the fingerprint sensor and further pressing the fingerprint sensor,
wherein the matching and login module is further configured to judge whether an operation time of the press-type touch operation is within a life span of currently acquired fingerprint data to be responsive to the detected press-type touch operation against the fingerprint sensor; and judge whether the fingerprint data stored in the designated security region matches the fingerprint password data by the operating system that has been waken up when the operation time of the press-type touch operation is within the life span of the currently acquired fingerprint data.

9. The MCU according to claim 8, wherein the acquisition module is further configured to: send a wake-up event notification to the operating system when the MCU is woken up in each wake-up cycle; and receive the fingerprint data acquisition instruction sent by the operating system each time upon receiving the wake-up event notification, and control the fingerprint sensor to acquire the fingerprint data based on the fingerprint data acquisition instruction.

10. The MCU according to claim 9, wherein the life span of the currently acquired fingerprint data is shorter than the wake-up cycle of the MCU.

11. The MCU according to claim 8, wherein the matching and login module is further configured to:
send a press event notification to the operating system that has been waken up if the operation time of the press-type touch operation is not within the life span of the currently acquired fingerprint data;
control the fingerprint sensor to re-acquire a fingerprint data upon receiving the fingerprint data acquisition instruction sent by the operating system based on the press event notification, and store the re-acquired fingerprint data to the designated security region by the operating system; and
judge whether the re-acquired fingerprint data in the designated security region matches the fingerprint password data by the operating system.

12. The MCU according to claim 8, wherein the designated security region in the terminal device is a trusted execution environment (TEE) region in the terminal device.

13. The MCU according to claim 8, wherein a fingerprint module where the fingerprint sensor is disposed is connected to a processor of the terminal device via a USB, the wake-up module is further configured to send a remote wake-up electrical signal via the USB, and remotely wake up the operating system by the remote wake-up electrical signal; or
wherein a fingerprint module where the fingerprint sensor is disposed is connected to a processor of the terminal device via a GPIO bus or an SPI bus, the wake-up module is further configured to send an interrupt signal via a GPIO bus, and wake up the operating system by the interrupt signal, the acquisition module is further configured to control the fingerprint sensor to acquire the fingerprint data based on the fingerprint data acquisition instruction sent by the operating system that has been waken up via the SPI bus.

14. The MCU according to claim 8, wherein the matching and login module is further configured to judge whether the fingerprint data stored in the designated security region matches fingerprint password data by the operating system that has been waken up to be responsive to the detected press-type touch operation against the fingerprint sensor, such that a screen of the terminal device is woken up by the operating system and the operating system is logged in if the stored fingerprint data matches the fingerprint password data.

15. The MCU according to claim 14, wherein the matching and login module is further configured to: responding to the detected press-type touch operation against the power button, wake up a screen of the terminal device by the operating system, and judge whether the fingerprint data stored in the designated security region matches the fingerprint password data by the operating system, such that a login operation of the operating system is performed if the stored fingerprint data matches the fingerprint password data.

16. A fingerprint-based power assembly, comprising a fingerprint sensor, a power button and an MCU, wherein the fingerprint sensor is integrated in the power button and is connected to the MCU, and the MCU comprising:
a wake-up module, configured to wake up an operating system of a terminal device where a fingerprint sensor is disposed to be responsive to a detected non-press-type touch operation of a user against the fingerprint sensor, wherein the non-press-type touch operation is an operation of engaging a finger of the user on the fingerprint sensor without pressing the fingerprint sensor;

an acquisition module, configured to control the fingerprint sensor to acquire fingerprint data based on a fingerprint data acquisition instruction sent by the operating system that has been waken up;

a storage module, configured to store the acquired fingerprint data to a designated security region of the terminal device by the operating system that has been waken up; and a matching and login module, configured to judge whether the fingerprint data stored in the designated security region matches fingerprint password data by the operating system that has been waken up to be responsive to a detected press-type touch operation against the fingerprint sensor, such that a login operation of the operating system is performed when the stored fingerprint data matches the fingerprint password data, wherein the press-type touch operation is an operation of engaging the finger of the user on the fingerprint sensor and further pressing the fingerprint sensor, wherein the matching and login module is further configured to judge whether an operation time of the press-type touch operation is within a life span of currently acquired fingerprint data to be responsive to the detected press-type touch operation against the fingerprint sensor; and judge whether the fingerprint data stored in the designated security region matches the fingerprint password data by the operating system that has been waken up when the operation time of the press-type touch operation is within the life span of the currently acquired fingerprint data.

17. The fingerprint power assembly according to claim 16, wherein the MCU is integrated in a power module where the fingerprint sensor is disposed.

18. An electronic terminal, comprising MCU, wherein the MCU is integrated in a fingerprint module of the electronic terminal, or the MCU is independent of the fingerprint module of the electronic terminal and is electrically connected to the fingerprint module, and the MCU comprises:

a wake-up module, configured to wake up an operating system of a terminal device where a fingerprint sensor is disposed to be responsive to a detected non-press-type touch operation of a user against the fingerprint sensor, wherein the non-press-type touch operation is an operation of engaging a finger of the user on the fingerprint sensor without pressing the fingerprint sensor;

an acquisition module, configured to control the fingerprint sensor to acquire fingerprint data based on a fingerprint data acquisition instruction sent by the operating system that has been waken up;

a storage module, configured to store the acquired fingerprint data to a designated security region of the terminal device by the operating system that has been waken up; and a matching and login module, configured to judge whether the fingerprint data stored in the designated security region matches fingerprint password data by the operating system that has been waken up to be responsive to a detected press-type touch operation against the fingerprint sensor, such that a login operation of the operating system is performed when the stored fingerprint data matches the fingerprint password data, wherein the press-type touch operation is an operation of engaging the finger of the user on the fingerprint sensor and further pressing the fingerprint sensor, wherein the matching and login module is further configured to judge whether an operation time of the press-type touch operation is within a life span of currently acquired fingerprint data to be responsive to the detected press-type touch operation against the fingerprint sensor; and judge whether the fingerprint data stored in the designated security region matches the fingerprint password data by the operating system that has been waken up when the operation time of the press-type touch operation is within the life span of the currently acquired fingerprint data.

* * * * *